July 26, 1932. R. C. SCHEMMEL 1,869,081
MOLDING
Filed Jan. 4, 1932
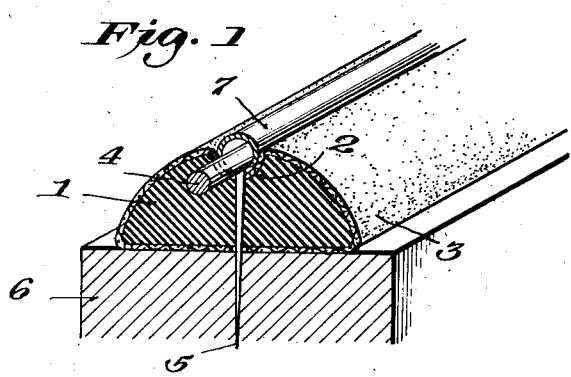
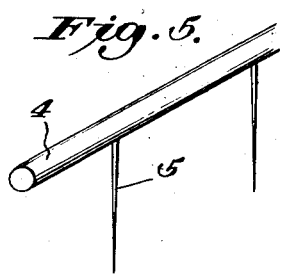
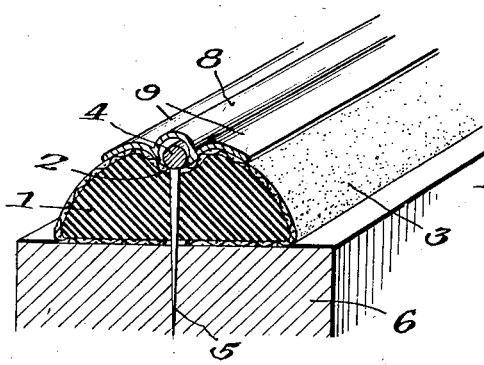
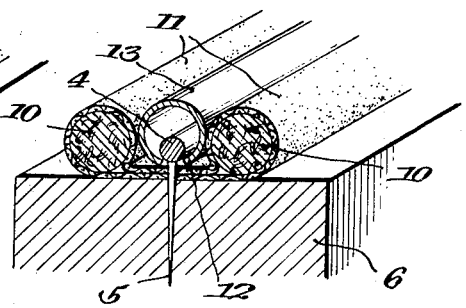
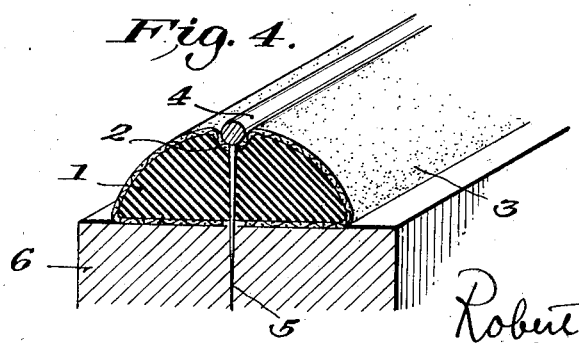
Inventor
Robert C. Schemmel
By Dyne & Kirchner
Attorney Patented July 26, 1932

1,869,081

UNITED STATES PATENT OFFICE

ROBERT C. SCHEMMEL, OF UNION CITY, INDIANA

MOLDING

Application filed January 4, 1932. Serial No. 584,745.

My invention relates to moldings, and more particularly to a type of multi-part molding device capable of a wide variety of useful applications in trimming automobile bodies, furniture, building interiors and the like.

The invention comprises a molding body adapted to be secured to a supporting surface to trim and ornament the same, and especially to cover and conceal the raw meeting edges of a fabric or other surface dressing applied to the support. A typical application for which my molding is particularly adapted and extensively used is in the building of automobile bodies, where the device is disposed about the body top or side wall, and through the interior surfaces, to trim the edges of roofing fabrics, upholstery coverings and the like.

Objects of the invention are to provide a trimming molding of the character indicated which may be economically manufactured, easily and quickly applied, durable, efficient in the performance of its functions, and highly ornamental.

A specific feature of the invention resides in the provision of a molding including a body, comprising the molding proper, and a bendable wire element associated with the body and serving two principal functions: that of constraining the body neatly about short curves and in any other desired form, and that of securing the body snugly against its support by means of fastening elements carried by the wire. In certain preferred embodiments of the invention I provide a split tubular metallic shell which is resiliently crimped over the wire to cover and conceal the same, which shell may be formed of lustrous or otherwise finished metal having physical properties different from those required in the wire. In one specific embodiment the body is provided with edge beads more or less flexibly associated together and the shell performs the function of urging the beads outwardly and down into snug engagement with the support.

Other and further advantages and features of the invention will sufficiently appear from the detailed description hereinafter.

The invention is shown on the accompanying drawing which forms part of this application for Letters Patent and in which the same reference character designates the same part in the several views.

In the accompanying drawing,

Figure 1 is a perspective view, with one end in section, of a molding assembly made according to the principles of the present invention;

Figs. 2, 3 and 4 are similar views of modified embodiments of the molding; and

Fig. 5 is a perspective view of the wire element of the molding.

Referring now to the drawing, the molding includes a body 1 forming the molding proper. This body is conveniently made of any moderately bendable material such as molded or extruded rubber, twisted paper, or the like, and is preferably provided in the form of a half-round strip of indefinite length.

The body is provided along its upper surface with a longitudinal channel 2, and is preferably enclosed by a fabric covering material 3 a portion of which forms the floor of the channel 2 and the edges of which are brought together in a butt seam along the under surface of the body. The covering fabric may be secured to the body by means of an adhesive or in any other convenient and well known manner.

In order to stiffen the body and to constrain it in preformed straight lines and curves, to fit the requirements of any given installation, I provide a bendable wire element 4, which is adapted to be received in the channel 2. This wire element is preferably made of inexpensive soft iron, which is readily bendable and pliable, and is capable of retaining any form into which it may be bent. Fastening elements 5 are provided in spaced apart alinement along the wire 4. I prefer to employ fastening elements in the form of headless nails welded to the wire 4 so that the elements 5 and 4 constitute in effect an integral assembly. It will be evident that when the wire 4 is received in the channel 2 of the body the fastening elements 5 may be passed downwardly through the covering fabric 3 forming the floor of the channel and through the adjacent portion of the body, to extend from the bottom surface of the body and penetrate a support 6 for the purpose of fixing the molding securely thereto.

It will be evident that the combination of parts thus far described provides a molding trim which may be easily applied to any supporting surface which pointed metallic fastening elements are able to penetrate. Furthermore, the molding may be disposed easily about turns of relatively short radius and permanently retained in such curved condition through the agency of the stiffening function of the wire 4.

The principal function of trimming moldings of the type to which my invention relates is one of ornamentation. I have found that the appearance of the molding shown in Fig. 4 and described hereinabove is in some installations not as good as may be desired, since flexing of the wire 4 back and forth during its application sometimes results in small kinks and similar irregularities in the wire. In addition, the soft iron material of the wire does not present a handsome, ornamental appearance, and the wire does not always lie evenly and symmetrically in the channel 2 unless considerable care is exercised in applying the wire to the molding body.

Accordingly I have provided a metallic shell 7 adapted to cover and conceal the wire 4. I prefer to provide this shell in the form of a split tube fashioned of metal which has been given a lustrous or otherwise ornamental surface finish. The shell 7 is crimped over the wire 4, conveniently after the wire has been driven home to the floor of the channel 2, and the shell is retained in place on the wire by its inherent resilience.

It will be evident that the shell 7 may be proportioned with respect to the channel 2 so as completely to fill the same. The wire 4 may be comparatively small in diameter, so that its location relatively to the axis of the channel 2, at any given portion of the assembly, is immaterial, the shell 7 completely concealing the wire 4 and presenting an appearance of perfect regularity and symmetry.

The shell 7 shown in Fig. 1 is plain and substantially tubular in form. The shell 8 shown in Fig. 2 is similar to the shell 7 so far as its central, wire-concealing and crimping portion is concerned, but is provided with laterally extending flanges 9 which overlie the portion of the fabric 3 forming the margins of the channel 2. It will be apparent that other and further modified forms of shell may be used, depending upon ornamental considerations.

In Fig. 3 I have illustrated a modified type of molding embodying the broad principles of the present invention. In Fig. 3 the body comprises a pair of spaced apart bead fillers 10 enclosed in a fabric covering 11. The disposition of the fillers in the fabric is such as to provide an intermediate longitudinal surface channel 12, analogous to the channel 2 of Figs. 1, 2 and 4. The marginal beads formed by the fillers 10 and their fabric covering are more or less limply and flexibly associated by their fabric web connection. A bendable wire 4 and integral fastening elements 5 are associated with the channel 12 as has been explained in connection with the types of molding shown in Figs. 1, 2 and 4. In Fig. 3 the diameter of the wire 4 is made considerably smaller than the width of the channel 12. Over the wire 4 is received a relatively large split tubular metallic shell 13 which may be structurally similar to the shell 7 of Fig. 1. In Fig. 3 the dimensions of the wire 4, the shell 13 and the channel 12 are so proportioned that when the shell is crimped down over the wire the flexibly connected marginal beads will be urged outwardly and down into snug engagement with the support 6.

It will be evident that the molding of Fig. 3 is securely held in place against inadvertent or accidental lifting by the opposition of the shell 13 to upward movement of the marginal body beads. In addition, the shell 13 conceals irregularities and unsightliness of the wire 4, presenting an appearance of ornamentation, regularity and symmetry.

I have shown and described the present invention in certain preferred forms of embodiment only, merely for purposes of exemplification. It is to be understood that the invention is capable of embodiment in other and further modified forms, and all such modifications, to the extent that they embody the principles of the invention as pointed out in the appended claims, are to be deemed within the scope and purview thereof.

I claim:

1. A molding including a body provided with a longitudinal surface channel, a fabric covering enclosing the body, a portion of the fabric forming the floor of the channel, a bendable wire carried in the channel having fastening elements projecting therefrom through the fabric and the body and adapted to engage a support, and a split tubular metallic shell engaged over the wire in the channel.

2. A molding including a body provided with a longitudinal surface channel, a fabric covering enclosing the body, a portion of the fabric forming the floor of the channel, a bendable wire carried in the channel having fastening elements projecting therefrom through the fabric and the body and adapted to engage a support, and a split tubular metallic shell resiliently crimped over and concealing the wire in the channel.

3. A molding including a body provided with a longitudinal surface channel, a fabric covering enclosing the body, a portion of the fabric forming the floor of the channel, a bendable soft iron wire carried in the channel having fastening elements projecting therefrom through the fabric and the body and adapted to engage a support, and a split tubular metallic shell, having a lustrous surface finish, engaged over the wire in the channel.

4. A molding including a body provided with a longitudinal surface channel, a fabric covering enclosing the body, a bendable iron wire carried in the channel having fastening elements projecting therefrom through the body and adapted to engage a support for securing the molding thereto, and a split tubular metallic shell, provided with laterally extending flanges, engaged over the wire in the channel.

5. A molding including a body provided with a longitudinal surface channel, a bendable iron wire carried in the channel having fastening elements projecting therefrom through the body and adapted to engage a support for securing the molding thereto, and a split tubular metallic shell, provided with laterally extending flanges, engaged over the wire in the channel.

6. A molding including a body provided with a longitudinal surface channel, a fabric covering enclosing the body, a portion of the fabric forming the floor of the channel, a bendable soft iron wire carried in the channel having fastening elements projecting therefrom through the fabric and the body and adapted to engage a support for securing the molding thereto, and a split tubular metallic shell provided with laterally extending flanges, the shell and its flanges having a lustrous surface finish, resiliently crimped over the wire in the channel and concealing the wire and the channel margins.

7. A molding including a body comprising a pair of spaced apart bead fillers and a fabric covering enclosing the fillers and providing an intermediate longitudinal surface channel, a bendable wire carried in the channel having fastening elements projecting therefrom through the body and adapted to engage a support for securing the molding thereto, and a split tubular metallic shell received over and concealing the wire in the channel.

8. A molding including a body comprising a pair of spaced apart bead fillers and a fabric covering enclosing the fillers providing marginal body beads and an intermediate longitudinal surface channel, a bendable wire carried in the channel having fastening elements projecting therefrom through the body and adapted to engage a support for securing the molding thereto, and a split tubular metallic shell received over and concealing the wire in the channel and urging the marginal body beads outwardly and down into snug engagement with the support.

9. A molding including a body comprising a pair of spaced apart bead fillers and a fabric covering enclosing the fillers providing marginal body beads and an intermediate longitudinal surface channel, a bendable wire carried in the channel having fastening elements projecting therefrom through the body and adapted to engage a support for securing the molding thereto, and a split tubular metallic shell resiliently crimped over and concealing the wire in the channel and urging the marginal body beads outwardly and down into snug engagement with the support.

In testimony whereof I affix my signature.
ROBERT C. SCHEMMEL.